Feb. 20, 1923.
C. R. PRATT.
CHUCK.
ORIGINAL FILED JULY 16, 1920.
1,446,065.
3 SHEETS—SHEET 1.
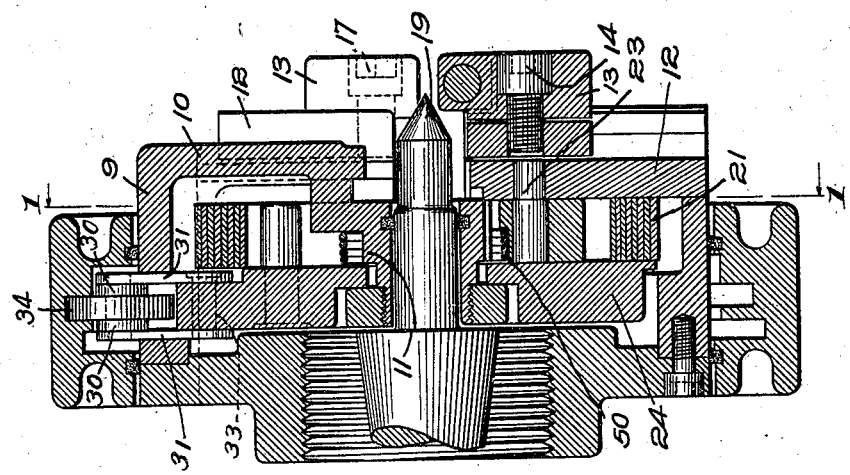
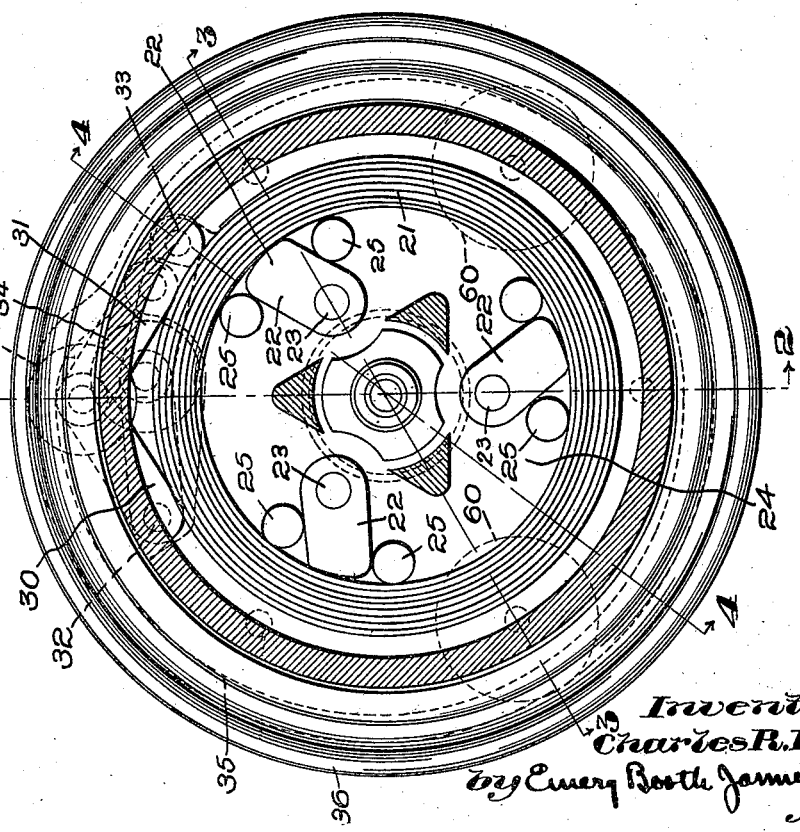
Inventor:
Charles R. Pratt.
by Emery Booth Janney & Varney
Attys

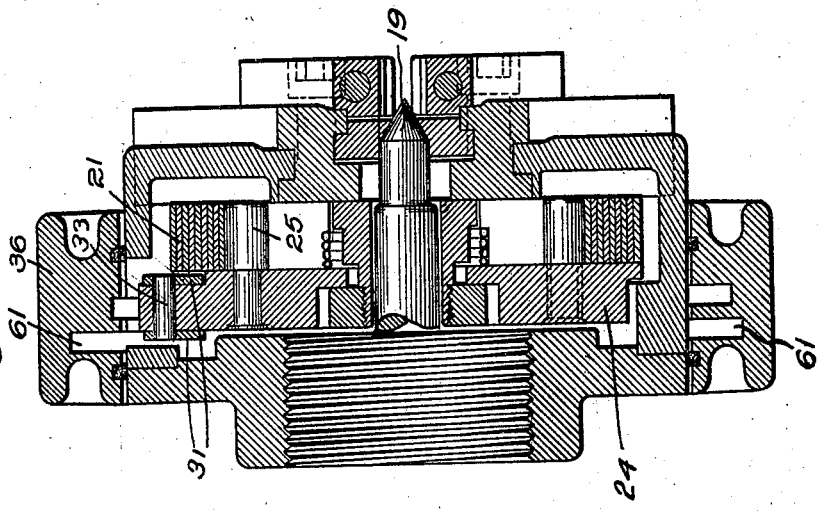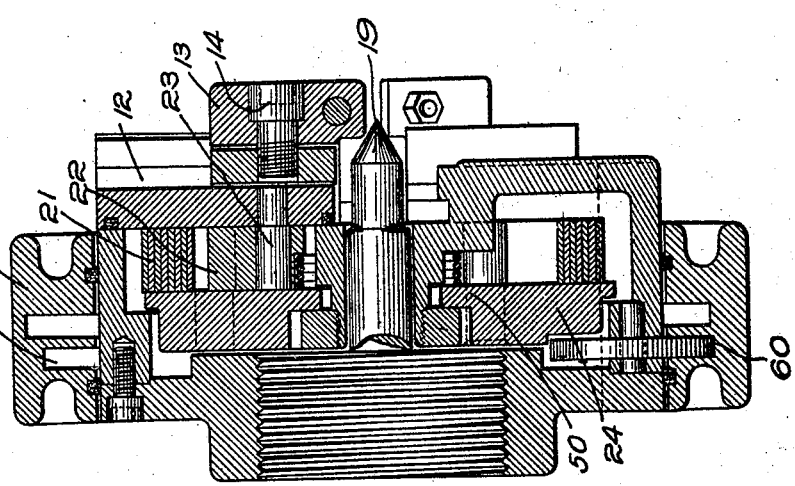

Feb. 20, 1923.
C. R. PRATT.
CHUCK.
ORIGINAL FILED JULY 16, 1920.
1,446,065.
3 SHEETS—SHEET 3.
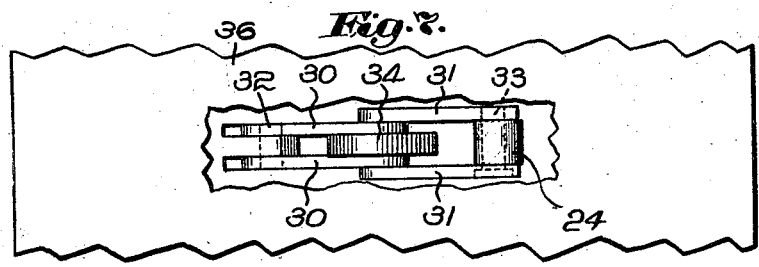
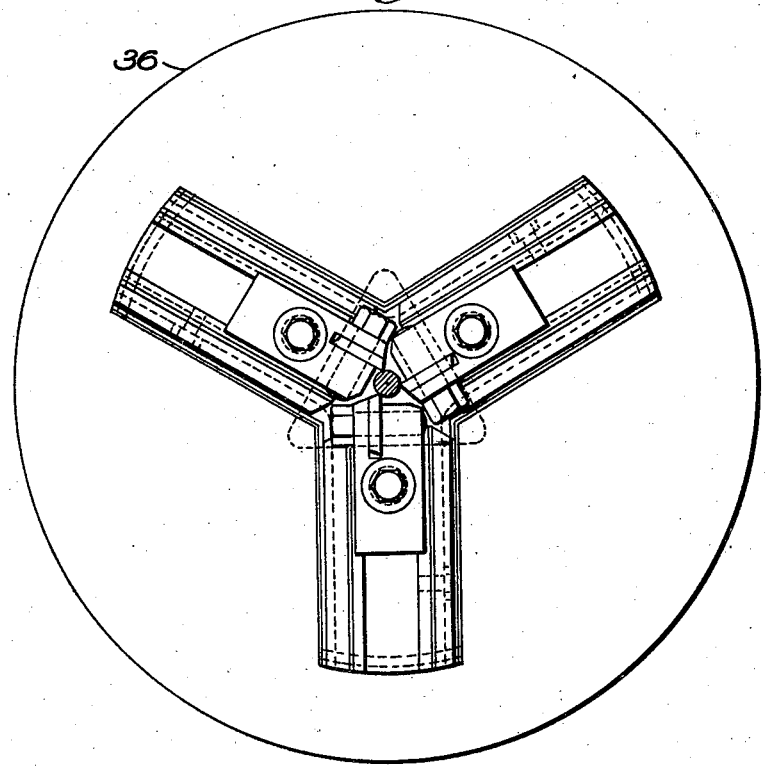
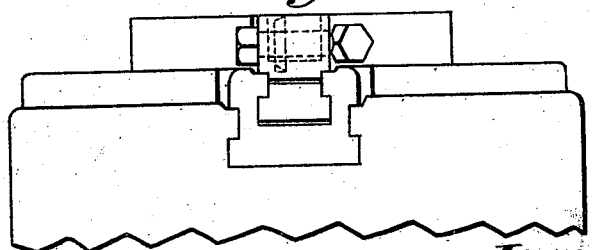
Inventor:
Charles R. Pratt.
by Emery Booth Janney Varney
Attys.

Patented Feb. 20, 1923.

1,446,065

UNITED STATES PATENT OFFICE.

CHARLES R. PRATT, OF MONTCLAIR, NEW JERSEY, ASSIGNOR TO THE E. HORTON & SON COMPANY, OF WINDSOR LOCKS, CONNECTICUT, A CORPORATION OF CONNECTICUT.

CHUCK.

Application filed July 16, 1920, Serial No. 396,808. Renewed October 9, 1922. Serial No. 593,443.

*To all whom it may concern:*

Be it known that I, CHARLES R. PRATT, a citizen of the United States, and a resident of Montclair, in the county of Essex, State of New Jersey, have invented an Improvement in Chucks, of which the following description, in connection with the accompanying drawings, is a specification, like characters on the drawings representing like parts.

This invention pertains to improvements in chucks.

It is among the objects of the invention to provide a chuck, primarily useful in connection with turning work on lathe centers and permitting ready opening and closing, preferably while the lathe spindle is turning.

In the drawings, which show a preferred form of one embodiment of my invention:—

Figure 1 is a section, through a chuck, on the line 1—1 of Fig. 2, being partly in elevation;

Figs. 2, 3, and 4 are sections on the lines 2—2, 3—3 and 4—4 of Fig. 1 respectively, each being partly in elevation;

Fig. 5 is a front elevation of the chuck;

Fig. 6 is a side elevation of a portion of the chuck showing an end view of a jaw and associated parts; and Fig. 7 is a view, showing a part of the chuck rim broken away to show a preferred form of toggle mechanism forming a portion of the preferred jaw-operating mechanism.

Referring to the drawings and to the preferred form of my invention selected for illustrative purposes, I have shown a chuck of the general type disclosed in my co-pending application, Serial No. 386,492 filed June 4th, 1920, and useful primarily for turning work on centers, though many features may be useful in other connections. The specific form of my invention illustrated includes a chuck body, preferably including a rim portion 9, a face portion 10 and a hub portion 11, said body preferably carrying in guided relation to the face portion a plurality of slides 12, forming a portion of the jaw mechanism, but preferably supplied with work-gripping jaws 13, which may be and preferably are adjustably mounted on the slides 12, such adjustment preferably being, as shown, provided by mounting the gripping jaws 13 in guideways on the slides 12 and by providing clamping means typified by the screw 14 for binding said jaws in any desired adjusted relationship to the slides 12.

The jaw mounting may be generally like that shown in my co-pending application above referred to.

The chuck illustrated is primarily, though not exclusively, intended for turning work on centers, and to this end I have provided an aperture extending through the axis of the chuck so that a lathe center held in the spindle of the lathe, may project through the chuck and into proximity to the jaws of the chuck. The lathe spindle, illustrated in the drawings, is numbered 19.

In the preferred form of my invention illustrated in the drawings, the pressure of the jaws on the work is resilient, and I preferably provide this resiliency by spring means, herein typified by the distortable ring 21 connected to the jaws by thrust means herein typified by the thrust elements 22, which may operate as toggles and which preferably include features more usually associated with cam mechanism, as more fully described hereinafter. The thrust elements 22 are connected to the slides 12 by pivot pins 23, and the thrust elements 22 bear against the interior of the spring ring 21. The angular position of the thrust elements 22 may be changed to operate the jaws and to put pressure on the spring ring in any suitable way, but I prefer to perform this by providing a spider 24, having means engaging each of the thrust elements 22, such means being typified by the pins or projections 25 located at each side of each thrust element. The spider 24 is preferably adapted to be oscillated to change the angle of position of the thrust elements, such oscillation being preferably effected by means operable while the chuck is rotating, and preferably dispensing with the usual chuck wrench or key. The preferred mechanism illustrated includes toggle elements 30, 31 pivoted at 32 and 33 to the chuck body and spider respectively, the toggle elements carrying between them a roller 34 adapted to cooperate with a cam surface 35, herein shown as formed interiorly of a ring 36 encircling the chuck body and adapted to rotate relative thereto, preferably, as shown, throughout any desired number of complete revolutions.

When the roller 34 bears against the portions of the cam surface 35 which are more remote from the axis of the chuck, the toggle elements 30, 31 will be flexed to a considerable degree of angularity and the pivots 32 and 33 will be closer to one another than when the toggle is straightened by reason of the bearing of the roller 34 against the portions of the cam surface 35 which are nearer the axis of the chuck.

The two extreme positions of the toggle are illustrated in Fig. 1. It will be understood that the position illustrated wherein the toggle is straightened, the roller 34 being marked 34′, would not occur while the chuck body and cam ring 36 are in the relative positions illustrated, but would occur pursuant to turning of the cam ring 36 relative to the chuck body in a clockwise direction through approximately three hundred and forty degrees.

When the toggle is flexed the relative positions of chuck body and spider 24 will be as shown in Fig. 1, the thrust elements 22 being rocked into work-releasing position and the jaws being retracted from the work by the spring 50 (Fig. 2), which presses the thrust elements 22 away from the axis of the chuck, and by reason of the connections 23 between the thrust elements 22 and slide jaws 12, serves also to retract the jaws from the work held between them.

When the toggle elements 30, 31 are straightened, the spider 24 will be turned relative to the chuck body in a clockwise direction by reason of the relative spreading apart of the pivots 32 and 33, thus causing the thrust elements 22 to press toward the axis of the chuck, the pivots 23 and the jaws connected to them, until the jaws engage the work. Any further relative movement of the spider relative to the chuck in a clockwise direction, after the jaws contact with the work will be effective to distort the spring ring 21 and hence to apply yielding, follow-up pressure to the work.

The cam ring may be journalled on the chuck body through two rollers 60 running in a centric groove 61 in the cam ring 36, and the toggle roller 34 may serve as an additional roller journal. The toggle 30, 31 tends to remain flexed and to keep the roller 34 against the cam surface 35.

As previously stated, when the cam ring 36 and chuck body are in the position shown in Fig. 1, the chuck jaws are not gripping the work. If the chuck is rotating in a contra-clockwise direction, as viewed in Fig. 1, retardation of the cam ring 36 will effect relative rotation of the cam ring relative to the chuck body in a clockwise direction. This will cause the toggle to be straightened and therefore cause the spider to oscillate relative to the chuck body in a clockwise direction, thereby causing the jaws to grip the work.

If a complete revolution of the cam ring relative to the chuck body is effected, the jaws will again release the work. The retarding operation should, therefore, be terminated before the complete relative revolution of the parts is effected. When it is desired to release the work, a further retardation of the cam ring 36 will complete the cycle of operation and release the work.

While I have shown and described a preferred form of one embodiment of my invention, it will be understood that changes involving omission, substitution, alteration, and reversal of parts, and even changes in the mode of operation, may be made without departing from the scope of my invention, which is best defined in the following claims.

Claims:

1. A chuck comprising, in combination, a plurality of jaws, a floating jaw-operating spring ring for moving said jaws coordinately toward the work and means for oscillating said ring during rotation of the chuck for controlling movement of said jaws in work-engaging or work-releasing direction.

2. A chuck comprising, in combination, a plurality of jaws, floating means resiliently actuating said jaws toward the work and means operable while the chuck is rotating for controlling movement of said jaws in work-engaging or work-releasing direction.

3. A chuck comprising, in combination, a plurality of jaws, floating jaw-operating means for moving said jaws coordinately toward the work and cam means operable during rotation of the chuck for controlling movement of said jaws in work-engaging or work-releasing direction.

4. A chuck comprising, in combination, a plurality of jaws, floating means resiliently actuating said jaws toward the work and cam means operable while the chuck is rotating for controlling movement of said jaws in work-engaging or work-releasing direction.

5. A chuck comprising, in combination, a plurality of jaws, floating jaw-operating means for moving said jaws coordinately toward the work and toggle means operable during rotation of the chuck for controlling movement of said jaws in work-engaging or work-releasing direction.

6. A chuck comprising, in combination, a plurality of jaws, floating means resiliently actuating said jaws toward the work and toggle means operable while the chuck is rotating for controlling movement of said jaws in work-engaging or work-releasing direction.

7. A chuck comprising, in combination, a plurality of jaws, floating jaw-operating means for moving said jaws coordinately toward the work and cam and toggle means operable during rotation of the chuck for controlling movement of said jaws in work-engaging or work-releasing direction.

8. A chuck comprising, in combination, a plurality of jaws, floating means resiliently actuating said jaws toward the work and cam and toggle means operable while the chuck is rotating for controlling movement of said jaws in work-engaging or work-releasing direction.

9. A chuck comprising, in combination, a body, a plurality of jaws, a floating spider, thrust elements between said floating spider and jaws, toggle means between said body and said floating spider, and cam means for straightening said toggle to oscillate said floating spider in a direction to apply the pressure of said jaws on the work.

10. A chuck comprising, in combination, a body, a plurality of jaws, a floating spider, thrust elements between said floating spider and jaws, toggle means between said body and said floating spider, and cam means for straightening said toggle to oscillate said floating spider in a direction to apply the pressure of said jaws on the work, said toggle having a roller projecting beyond the rim of said body to engage said cam means.

11. A chuck comprising, in combination, a body, a plurality of jaws slidable in guided relation to said body, floating means for resiliently actuating said jaws into work-engaging position, and controlling means operable during rotation of the chuck for applying or removing the pressure of said floating resilient means from the jaws, said controlling means including a ring having an interior cam surface and surrounding the chuck body.

12. A chuck comprising, in combination, a body, a plurality of jaws slidable in guided relation to said body, floating means comprising a spring ring for resiliently actuating said jaws into work-engaging position, and controlling means operable during rotation of the chuck for applying or removing the pressure of said floating resilient means from the jaws, said controlling means including a ring having an interior cam surface and surrounding the chuck body.

13. A chuck comprising, in combination, a body, a plurality of jaws slidable in guided relation to said body, floating means comprising a helically wound leaf spring ring for resiliently actuating said jaws into work-engaging position, and controlling means operable during rotation of the chuck for applying or removing the pressure of said floating resilient means from the jaws, said controlling means including a ring having an interior cam surface and surrounding the chuck body.

In testimony whereof, I have signed my name to this specification.

CHARLES R. PRATT.